(12) United States Patent
McClure

(10) Patent No.: US 11,192,602 B2
(45) Date of Patent: Dec. 7, 2021

(54) METHOD OF RELOCATING RIDER POSITION A DESIRED DISTANCE ON A MOTORCYCLE AND A TRIKE

(71) Applicant: Bryan McClure, Iron Station, NC (US)

(72) Inventor: Bryan McClure, Iron Station, NC (US)

( * ) Notice: Subject to any disclaimer, the term of this patent is extended or adjusted under 35 U.S.C. 154(b) by 26 days.

(21) Appl. No.: 16/835,108

(22) Filed: Mar. 30, 2020

(65) Prior Publication Data

US 2020/0223508 A1 Jul. 16, 2020

Related U.S. Application Data

(63) Continuation of application No. 15/857,053, filed on Dec. 28, 2017, now abandoned.

(60) Provisional application No. 62/541,063, filed on Aug. 3, 2017.

(51) Int. Cl.
*B62K 5/06* (2006.01)
*B62K 5/027* (2013.01)
*B62K 11/02* (2006.01)
*B62J 1/12* (2006.01)
*B62K 25/28* (2006.01)

(52) U.S. Cl.
CPC ........ *B62K 5/06* (2013.01); *B62J 1/12* (2013.01); *B62K 11/02* (2013.01); *B62K 25/283* (2013.01); *B62K 5/027* (2013.01)

(58) Field of Classification Search
CPC .......... B62K 5/06; B62K 5/027; B62K 11/02; B62K 13/08; B62K 13/00
USPC .................. 180/209, 210, 218, 219
See application file for complete search history.

(56) References Cited

U.S. PATENT DOCUMENTS

| | | | |
|---|---|---|---|
| 2,604,336 | A | 7/1952 | Seddon et al. |
| 3,521,904 | A | 7/1970 | Sheffer |
| 5,458,213 | A | 10/1995 | Nakaya et al. |
| 7,111,861 | B2 | 9/2006 | Pender |
| 7,234,558 | B2 | 6/2007 | Toftner |
| 7,717,214 | B2 | 5/2010 | Gilbert |
| 7,950,736 | B2 | 5/2011 | Olson |
| 8,181,981 | B2 | 5/2012 | Stenberg |
| 9,327,802 | B1 | 5/2016 | Chang et al. |
| 9,340,254 | B2 | 5/2016 | Bland |
| 9,428,237 | B2 | 8/2016 | Toftner |
| 2007/0004488 | A1 | 1/2007 | Kirila |
| 2007/0235977 | A1 | 10/2007 | Cleland |

(Continued)

*Primary Examiner* — Keith J Frisby
(74) *Attorney, Agent, or Firm* — Jeffrey C. Watson; Mathew L. Grell; Grell & Watson Patent Attorneys LLC

(57) ABSTRACT

A kit for relocating the rider position on a motorcycle or a trike with a standard-length subframe, a standard-length swing arm, standard-length side panels, a standard-length seat, a standard drive, and a standard-length exhaust, includes an extended subframe, an extended swing arm, extended side panels, an extended seat, an extended drive conversion, and an exhaust extender. The extended subframe is extended from the standard-length subframe. The extended swing arm is extended from the standard-length swing arm. The extended side panels are extended from the standard-length side panels. The extended seat is extended from the standard-length seat. The extended drive conversion is for extending the length of the standard drive. The exhaust extender is for extending the length of the standard-length exhaust. Whereby, when the kit is installed on the motorcycle or the trike, the rider position on the motorcycle or the trike is relocated backwards.

6 Claims, 14 Drawing Sheets

(56) References Cited

U.S. PATENT DOCUMENTS

2017/0113753 A1     4/2017   Chang et al.
2017/0113754 A1     4/2017   Chang

METHOD OF RELOCATING RIDER POSITION A DESIRED DISTANCE ON A MOTORCYCLE AND A TRIKE

CROSS-REFERENCE TO RELATED APPLICATIONS

This application is a continuation of U.S. patent application Ser. No. 15/857,053 filed on Dec. 28, 2017, which claims priority from U.S. Provisional Application No. 62/541,063 filed Aug. 3, 2017, which are incorporated herein by reference in their entirety.

FIELD OF THE DISCLOSURE

The present disclosure relates to a rider relocation kit for motorcycles and trikes and method of use thereof. More specifically, the present disclosure relates to a rider relocation kit and method for relocating the rider's position on motorcycles and trikes backwards for providing an extended position for taller riders.

BACKGROUND

A motorcycle often called a bike, motorbike, or cycle is a two wheeled motor vehicle. A trike is a similar motor vehicle, but has three wheels instead of two. Motorcycle and trike designs vary greatly to suit a range of different purposes: long distance travel, commuting, cruising, sport including racing, and off-road riding. Motorcycles and trikes typically are bought stock with a standard-length subframe, a standard-length swing arm, standard-length side panels, a standard-length seat, a standard drive, and a standard-length exhaust.

One problem that has been discovered with stock motorcycles and trikes is that they are designed for the average size rider. As such, most ergonomics for motorcycles and trikes are designed for 5' 10" riders. This will work for shorter riders or riders up to 6 2". Because motorcycles and trikes do not provide any adjustability of the seat, handle bars, foot pegs, etc., riders taller than 6'2" are often put in uncomfortable crouched positions. Therefore, a need exists for a way to relocate the rider position for taller riders to provide a more comfortable extended position.

The instant disclosure of a rider relocation kit for motorcycles and trikes and method of use thereof may be designed to address at least certain aspects of the problems discussed above.

SUMMARY

Briefly described, in a possibly preferred embodiment, the present disclosure overcomes the above-mentioned disadvantages and meets the recognized need for such an apparatus or method by providing of a rider relocation kit for motorcycles and trikes, and method of use thereof. The rider relocation kit may be for use on a motorcycle or a trike with a standard-length subframe, a standard-length swing arm, standard-length side panels, a standard-length seat, a standard drive, and a standard-length exhaust. The rider relocation kit may include an extended subframe, an extended swing arm, extended side panels, an extended seat, an extended drive conversion, and an exhaust extender. The extended subframe is extended from the standard-length subframe. The extended swing arm is extended from the standard-length swing arm. The extended side panels are extended from the standard-length side panels. The extended seat is extended from the standard-length seat. The extended drive conversion is for extending the length of the standard drive. The exhaust extender is for extending the length of the standard-length exhaust. Whereby, when the kit is installed on the motorcycle or the trike, the rider position on the motorcycle or the trike is relocated backwards.

One feature of the instant kit for relocating the rider position may be that when the kit is installed on the motorcycle or the trike, the rider position on the motorcycle or the trike is relocated so that a tall rider is moved from a crouched position to an extended position.

In select embodiments of the kit for relocating the rider position, the kit may be configured for relocating the rider position a desired distance. In these embodiments, the extended subframe may be extended the desired distance from the standard-length subframe. The extended swing arm may be extended the desired distance from the standard-length swing arm. The extended side panels may be extended the desired distance from the standard-length side panels. The extended seat may be extended the desired distance from the standard-length seat. The extended drive conversion may be extended the desired distance from the standard drive. The exhaust extender may extend the standard-length exhaust the desired distance. As an example, and clearly not limited thereto, the kit may be configured for relocating the rider position the desired distance of four inches or approximately four inches. In this example, the extended subframe may be extended four inches or approximately four inches from the standard-length subframe. The extended swing arm may be extended four inches or approximately four inches from the standard-length swing arm. The extended side panels may be extended four inches or approximately four inches from the standard-length side panels. The extended seat may be extended four inches or approximately four inches from the standard-length seat. The extended drive conversion may be extended four inches or approximately four inches from the standard drive. The exhaust extender may extend the standard-length exhaust four inches or approximately four inches.

In select embodiments of the kit for relocating the rider position, if necessary, the kit may further include an extended brake line. In select embodiments, the extended brake line may be extended a desired distance from a standard brake line. As an example, and clearly not limited thereto, the extended brake line may be extended four inches or approximately four inches.

In select embodiments of the kit for relocating the rider position, if necessary, the kit may further include an extended wiring harness. In select embodiments, the extended wiring harness may be extended a desired distance from a standard brake line. As an example, and clearly not limited thereto, the extended wiring harness may be extended four inches or approximately four inches.

In another aspect, the instant disclosure embraces a method of relocating the rider position on a motorcycle or a trike with a standard-length subframe, a standard-length swing arm, standard-length side panels, a standard-length seat, a standard drive, and a standard-length exhaust. The method may generally include the steps of providing the kit for relocating the rider position in any of the embodiments shown and/or described herein, and installing the kit on the motorcycle or the trike, whereby the rider position on the motorcycle or the trike is relocated backwards.

In select embodiments of the method of relocating the rider position of the instant disclosure, the kit for relocating the rider position may include an extended subframe, an extended swing arm, extended side panels, an extended seat, an extended drive conversion, and an exhaust extender. The extended subframe is extended from the standard-length subframe. The extended swing arm is extended from the standard-length swing arm. The extended side panels are extended from the standard-length side panels. The extended seat is extended from the standard-length seat. The extended drive conversion is for extending the length of the standard drive. The exhaust extender is for extending the length of the standard-length exhaust. Whereby, when the kit is installed on the motorcycle or the trike, the rider position on the motorcycle or the trike is relocated backwards.

One feature of the instant method for relocating the rider position, the step of installing the kit on the motorcycle or the trike may include the rider position on the motorcycle or the trike being relocated so that a tall rider is moved from a crouched position to an extended position.

In select embodiments of the method for relocating the rider position, the kit may be configured for relocating the rider position to a desired distance. In these embodiments, the extended subframe may be extended the desired distance from the standard-length subframe. The extended swing arm may be extended the desired distance from the standard-length swing arm. The extended side panels may be extended the desired distance from the standard-length side panels. The extended seat may be extended the desired distance from the standard-length seat. The extended drive conversion may be extended the desired distance from the standard drive. The exhaust extender may extend the standard-length exhaust the desired distance.

In select embodiments of the method for relocating the rider position, the kit may further include an extended brake line and/or an extended wiring harness. In select embodiments, the extended brake line and/or the extended wiring harness may be extended a desired distance from a standard brake line and/or standard wiring harness.

In select embodiments of the method for relocating the rider position, the step of installing the kit on the motorcycle or the trike may include the steps of: removing standard parts; and installing extended parts. In these embodiments, the step of removing standard parts may include: removing the standard-length subframe; removing the standard-length swing arm; removing the standard-length side panels; removing the standard-length seat; removing the standard drive; and removing the standard-length exhaust. Likewise, in these embodiments, the step of installing extending parts may include: installing the extended subframe; installing the extended swing arm; installing the extended side panels; installing the extended seat; installing the extended drive; and installing the extended exhaust.

The foregoing illustrative summary, as well as other exemplary objectives and/or advantages of the disclosure, and the manner in which the same are accomplished, may become more apparent to one skilled in the art from the prior Summary, and the following Brief Description of the Drawings, Detailed Description, and Claims when read in light of the accompanying Detailed Drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Figure 1:
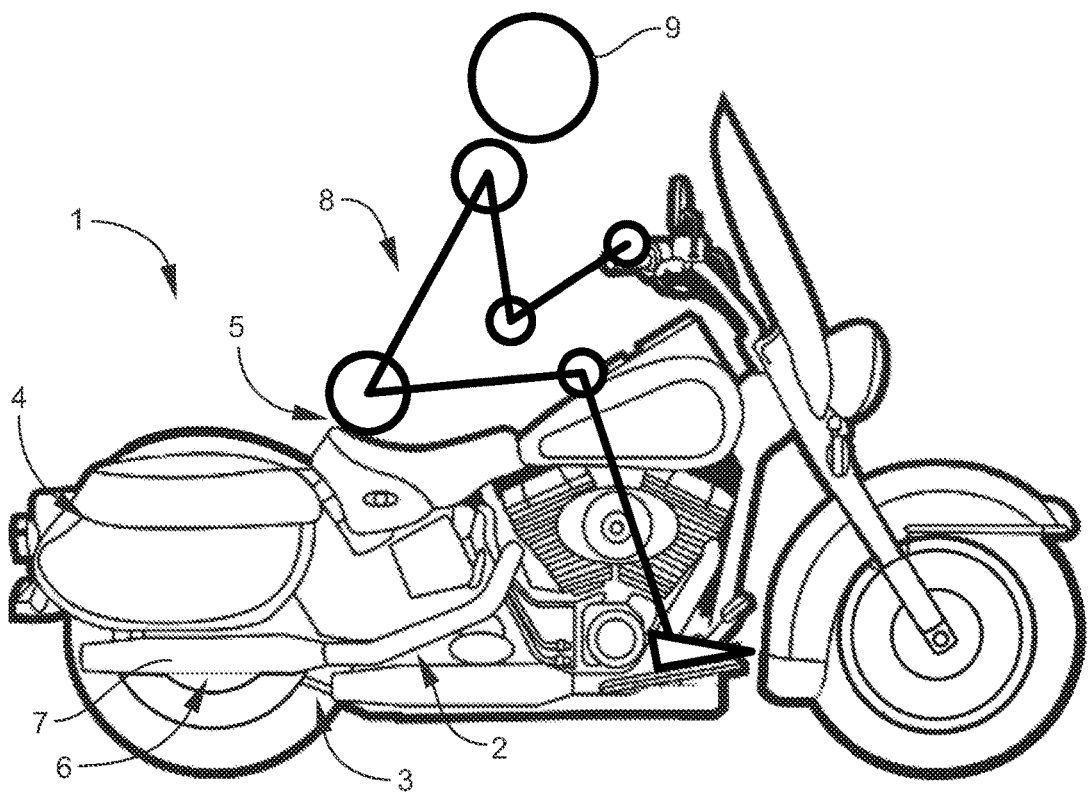
FIG. 1 shows a side view of a motorcycle according to the prior art with a tall rider in a crouched position.
Figure 12:
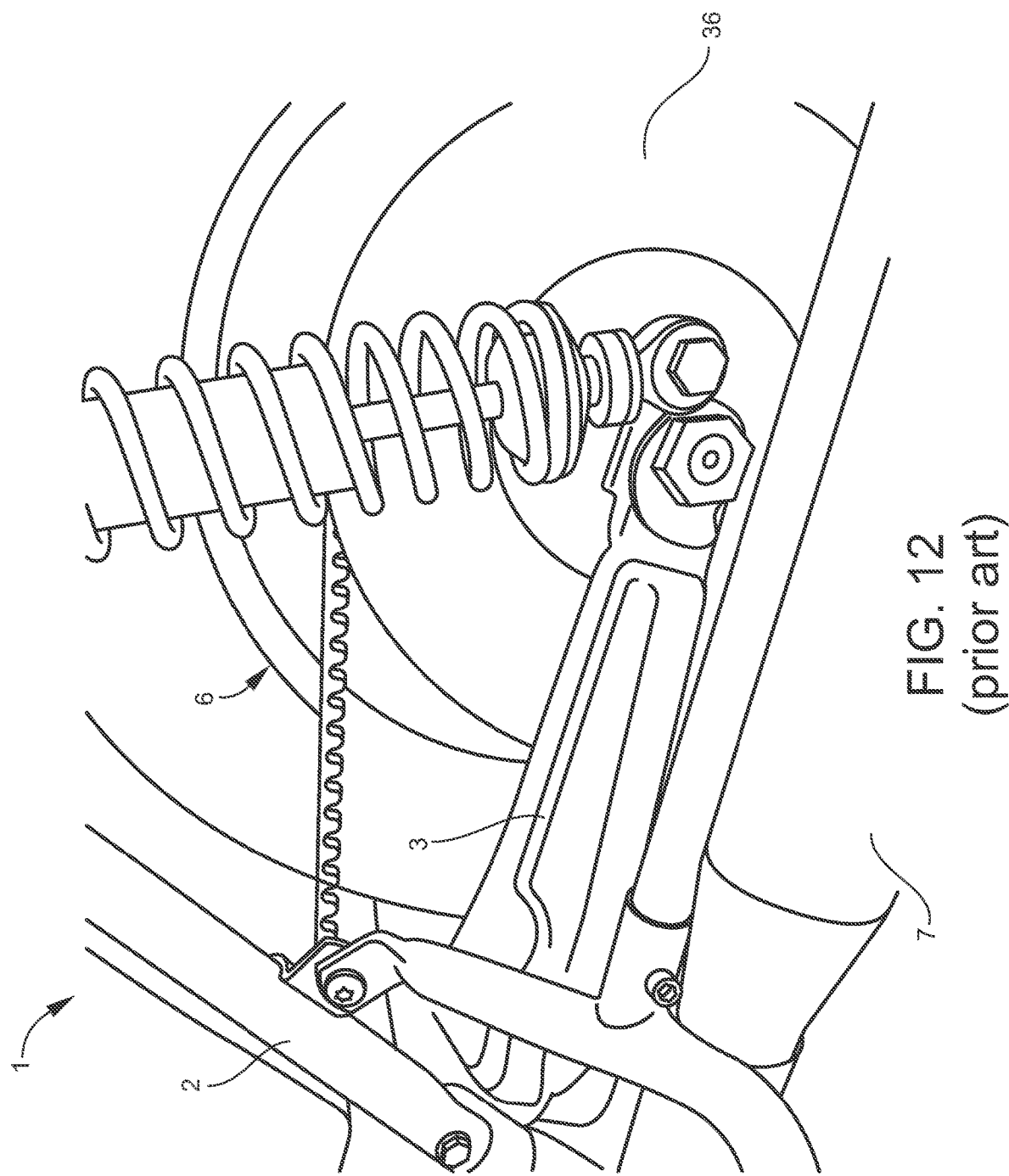
FIG. 12 depicts the rear of a motorcycle with a standard belt and standard exhaust according to the prior art.

Referring first to FIGS. 1 and 12, a stock motorcycle 1 is shown according to the prior art. Although the instant disclosure may be directed to stock motorcycle 12, the disclosure is not so limited, and other similar vehicles may be used, including, but not limited to, trikes. Stock motorcycle 12 includes standard-length subframe 2, standard-length swing arm 3, standard-length side panels 4, standard-length seat 5, standard drive 6 (as shown in FIG. 12), and standard-length exhaust 7. In addition, stock motorcycle 12 includes a standard length wiring harness and a standard length brake line. As shown, when tall rider 9 is positioned on stock motorcycle 12, tall rider 9 is put in crouched position 8 which may be uncomfortable, especially for long rides or cruises.

The instant disclosure provides for a kit and method for relocating the rider position to improve this crouched position 8 for tall rider 9. Although, the instant disclosure may be shown herein as directed toward relocating the rider position rearward for taller riders, the disclosure is not so limited, and may also be used for relocating the rider position forward for shorter riders.

Referring now to FIGS. 2-11 and 13-15, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 2-11, 13 and 14, in a possibly preferred embodiment, the present disclosure overcomes the above-mentioned disadvantages and meets the recognized need for such an apparatus or method by providing of rider relocation kit 10 for motorcycles, trikes, the like, etc. The rider relocation kit 10 may be for use on motorcycle 12 (or a trike or other similar vehicle or device) with standard-length subframe 2, standard-length swing arm 3, standard-length side panels 4, standard-length seat 5, standard drive 6, and standard-length exhaust 7. The rider relocation kit 10 may generally include extended subframe 14, extended swing arm 16, extended side panels 18, extended seat 20 with extended cover 22, extended drive conversion 24, and exhaust extender 26.

Figure 3:
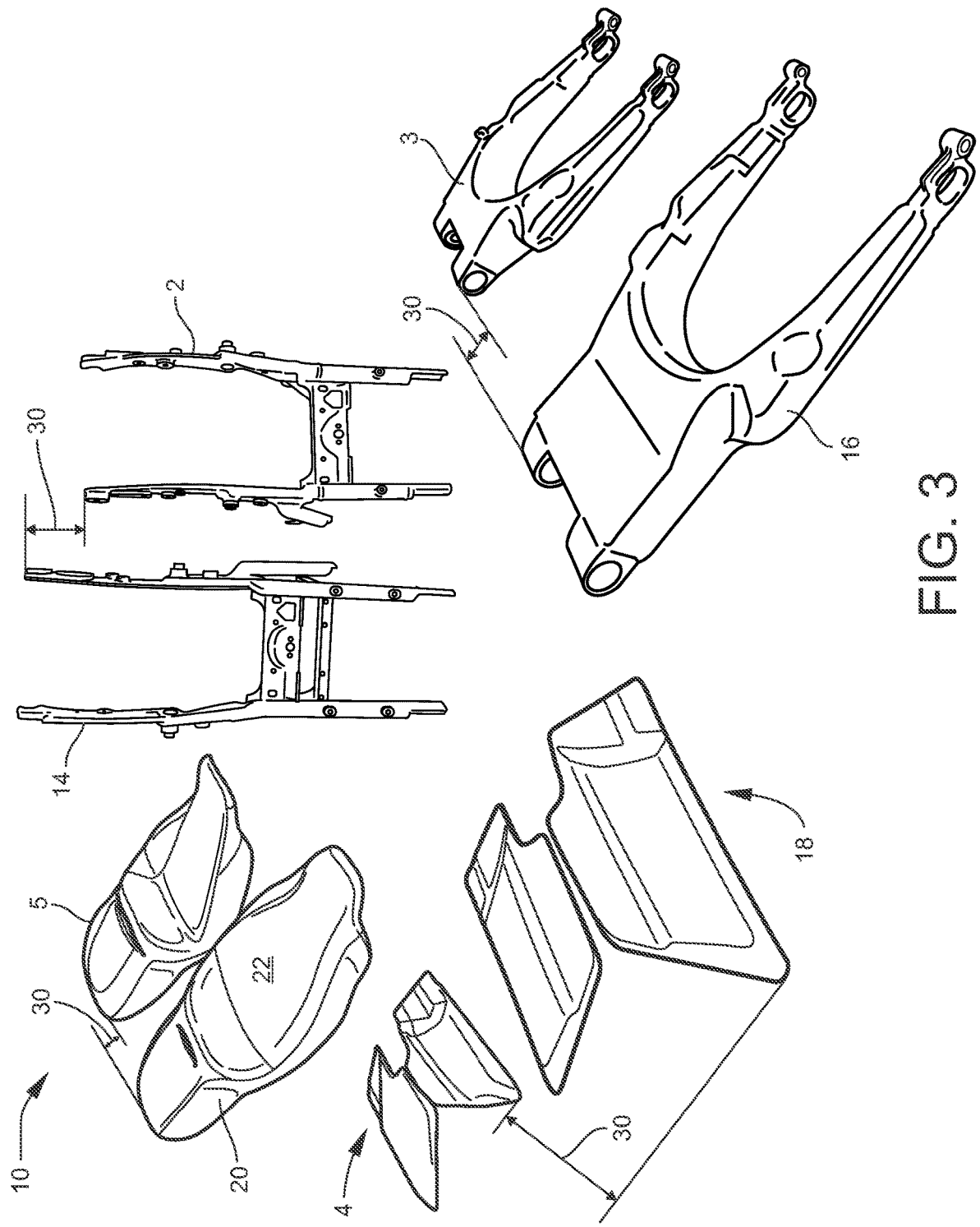
FIG. 3 depicts a perspective view of the rider relocation kit according to select embodiments of the instant disclosure without the final drive conversion, brake lines (if necessary), and wiring harness (if necessary) shown side by side with the stock or standard-length parts.
Figure 4:
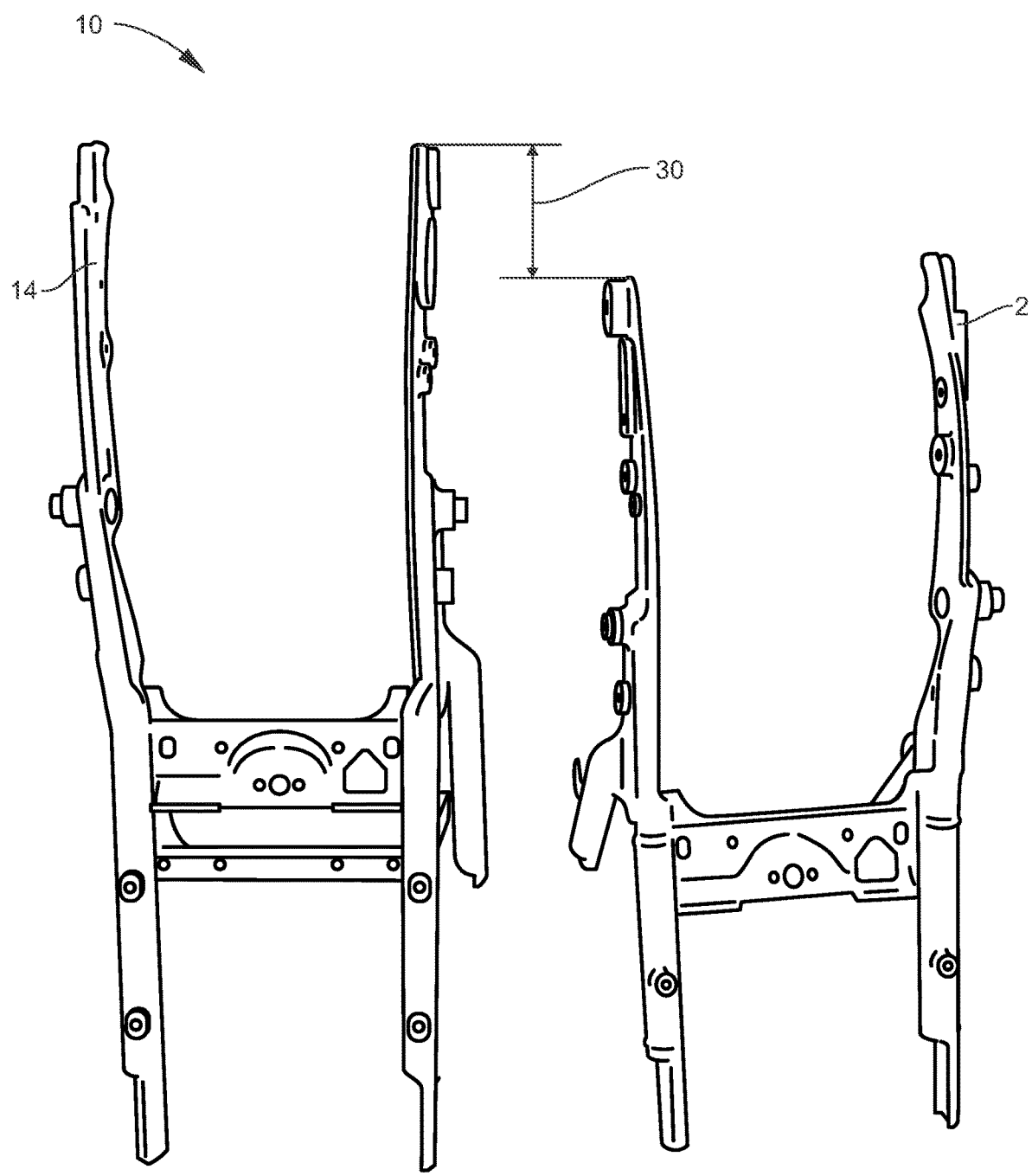
FIG. 4 depicts a front perspective view of a subframe from the rider relocation kit shown in FIG. 1 (left side) shown next to a stock or standard length subframe (right side)
Figure 5:
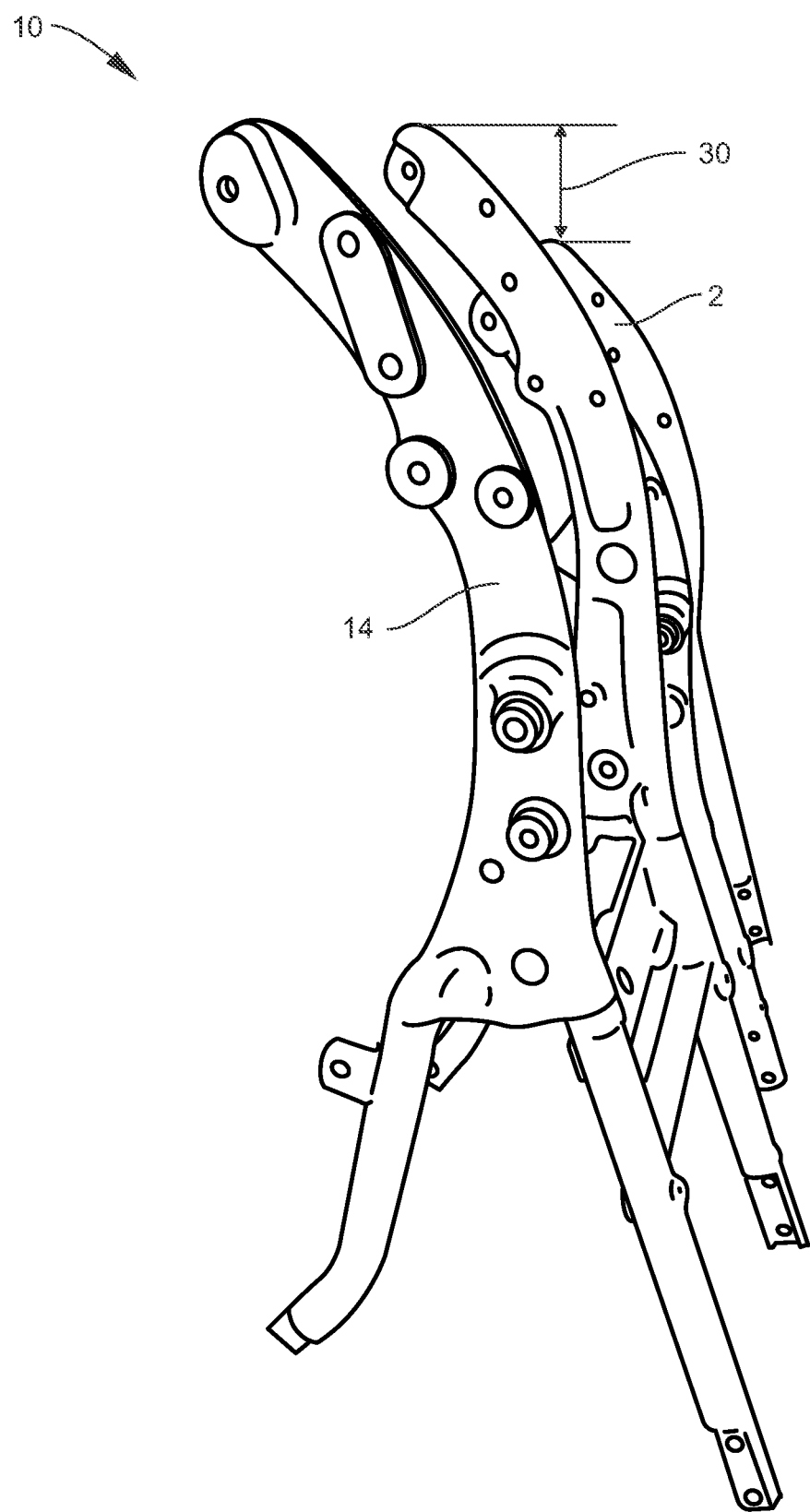
FIG. 5 depicts a side perspective view of a subframe from the rider relocation kit shown in FIG. 1 (front) shown in front of a stock or standard length subframe (behind)

Referring specifically to FIGS. 3, 4 and 5, the extended subframe 14 of kit 10 may be extended from the standard-length subframe 2. As shown in the Figures, extended subframe 14 may have the same shape and overall design as standard-length subframe 2, but may be extended from the connection points desired distance 30. This desired distance 30 may be varied for extended subframe 14 based on the desired relocation of the rider position. As an example, and clearly not limited thereto, extended subframe 14 may be extended four inches, or approximately four inches from standard-length subframe 2.

Figure 6:
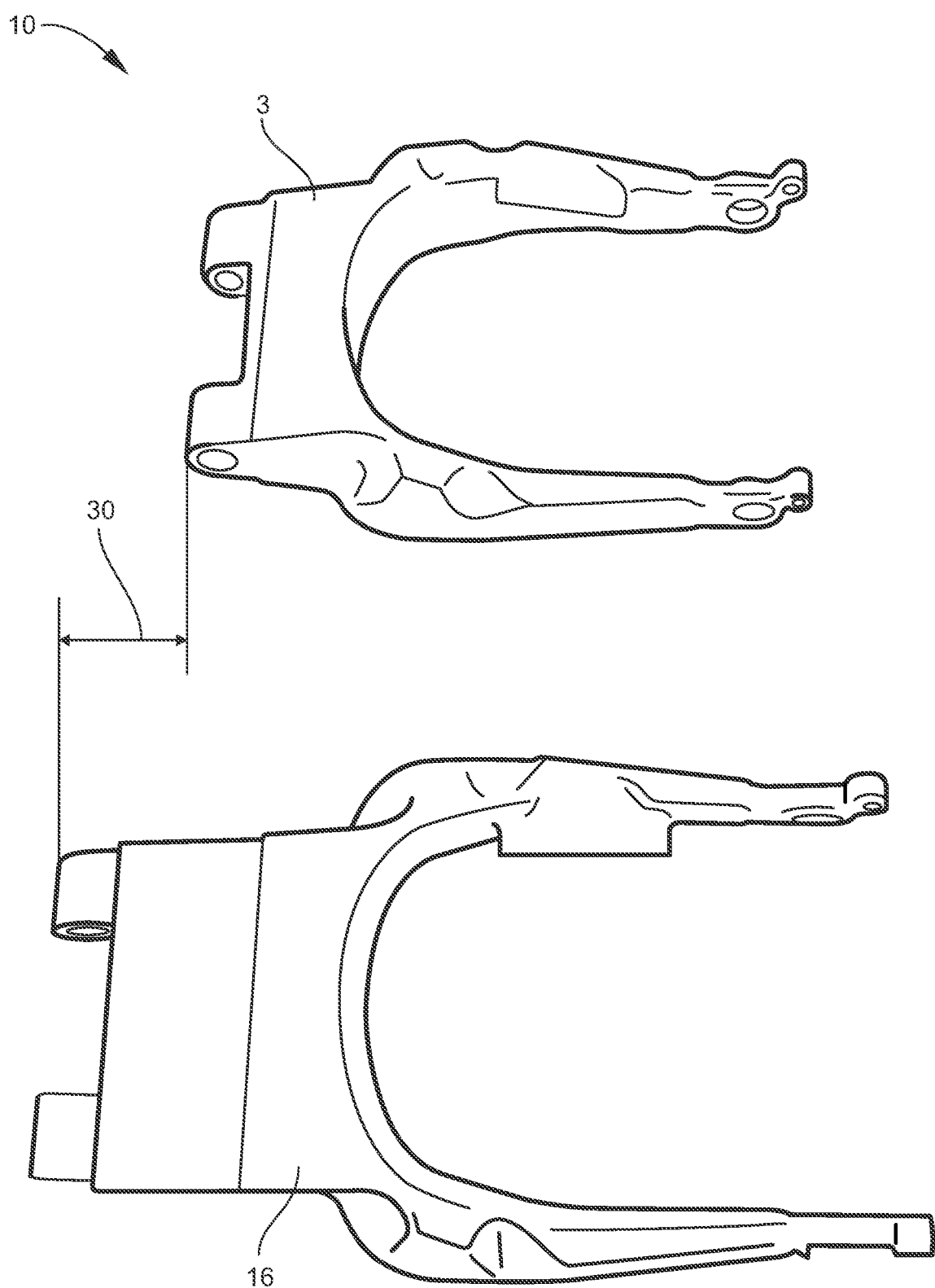
FIG. 6 depicts a top view of a swing arm from the rider relocation kit shown in FIG. 1 (bottom) shown next to a stock or standard-length swing arm (top)
Figure 7:
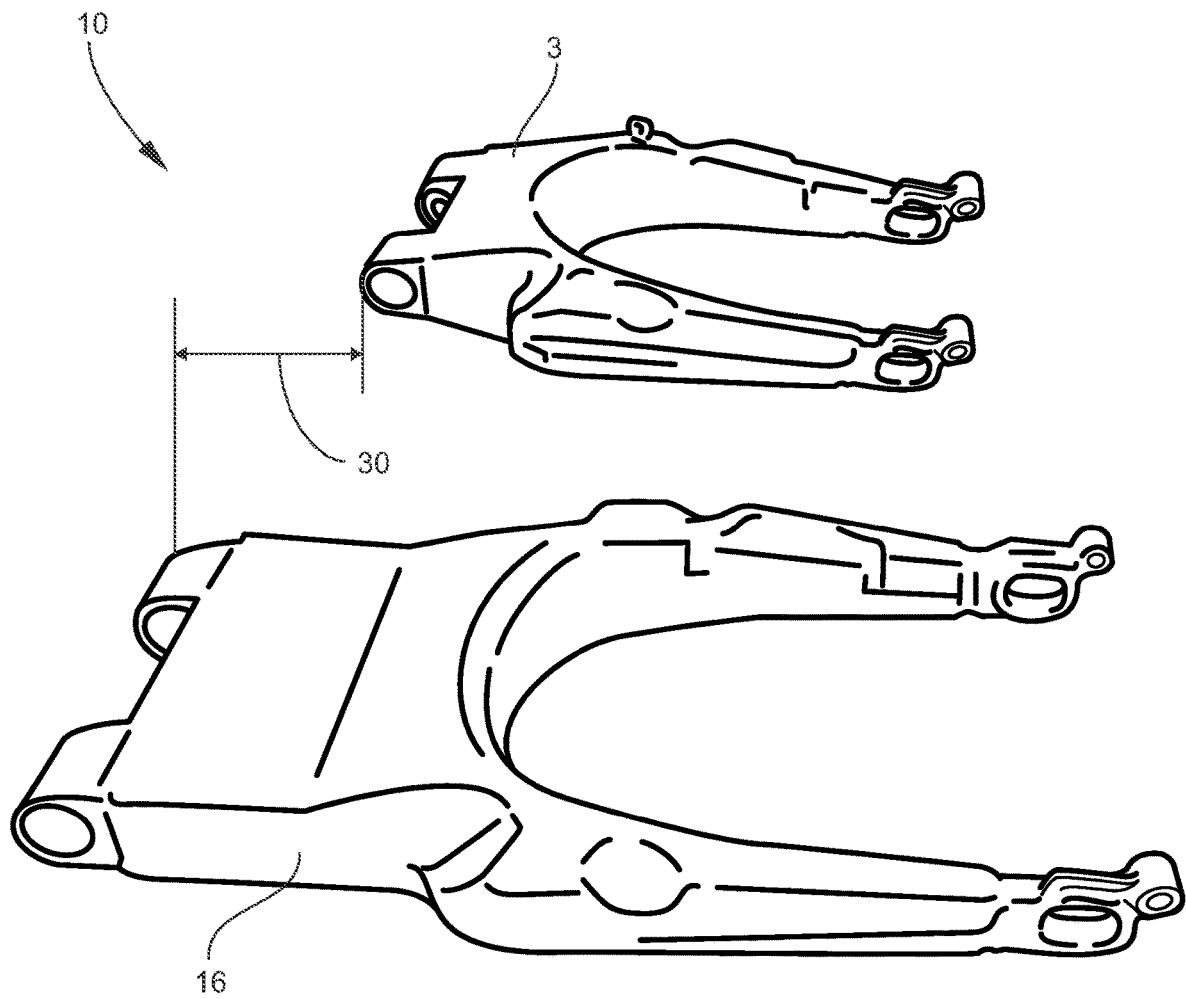
FIG. 7 depicts a side perspective view of a swing arm from the rider relocation kit shown in FIG. 1 (bottom) shown next to a stock or standard-length swing arm (top)

Referring specifically to FIGS. 3, 6 and 7, the extended swing arm 16 of kit 10 may be extended from the standard-length swing arm 3. As shown in the Figures, extended swing arm 16 may have the same shape and overall design as standard-length swing arm 3, but may be extended from the connection points desired distance 30. This desired distance 30 may be varied for extended swing arm 16 based on the desired relocation of the rider position. As an example, and clearly not limited thereto, extended swing arm 16 may be extended four inches, or approximately four inches from standard-length swing arm 3.

Figure 8:
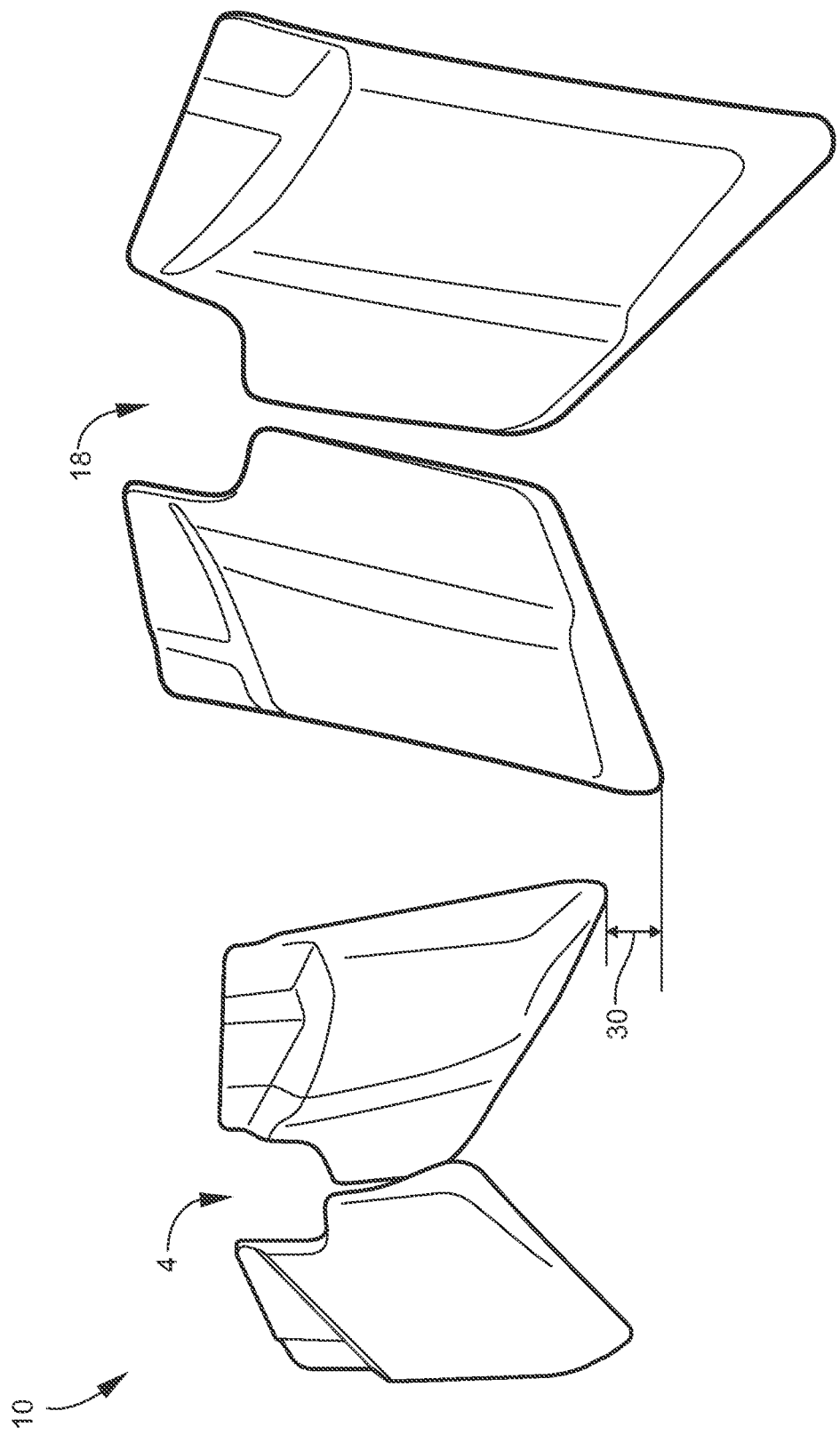
FIG. 8 depicts a top perspective view of side panels from the rider relocation kit shown in FIG. 1 (right side) shown next to stock or standard-length side panels (left side)

Referring specifically to FIGS. 3 and 8, the extended side panels 18 of kit 10 may be extended from the standard-length side panels 4. As shown in the Figures, extended side panels 18 may have the same shape and overall design as standard-length side panels 4, but may be extended from the in overall length desired distance 30. This desired distance 30 may be varied for extended side panels 18 based on the desired relocation of the rider position. As an example, and clearly not limited thereto, extended side panels 18 may be extended four inches, or approximately four inches from standard-length side panels 4.

Figure 9:
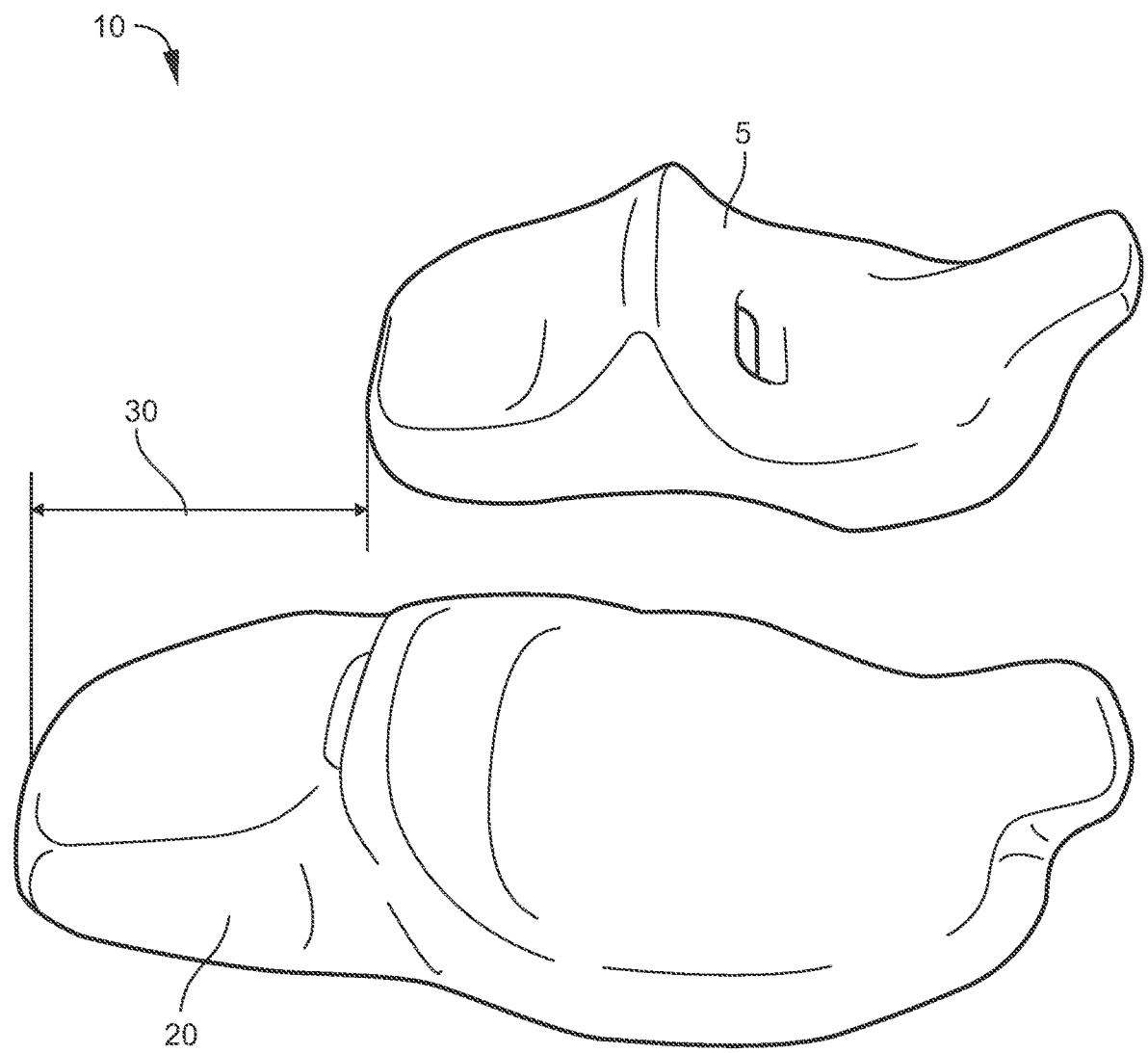
FIG. 9 depicts a top perspective view of a seat without a cover from the kit shown in FIG. 1 (bottom) shown next to a stock or standard-length seat without a cover (top)
Figure 10:
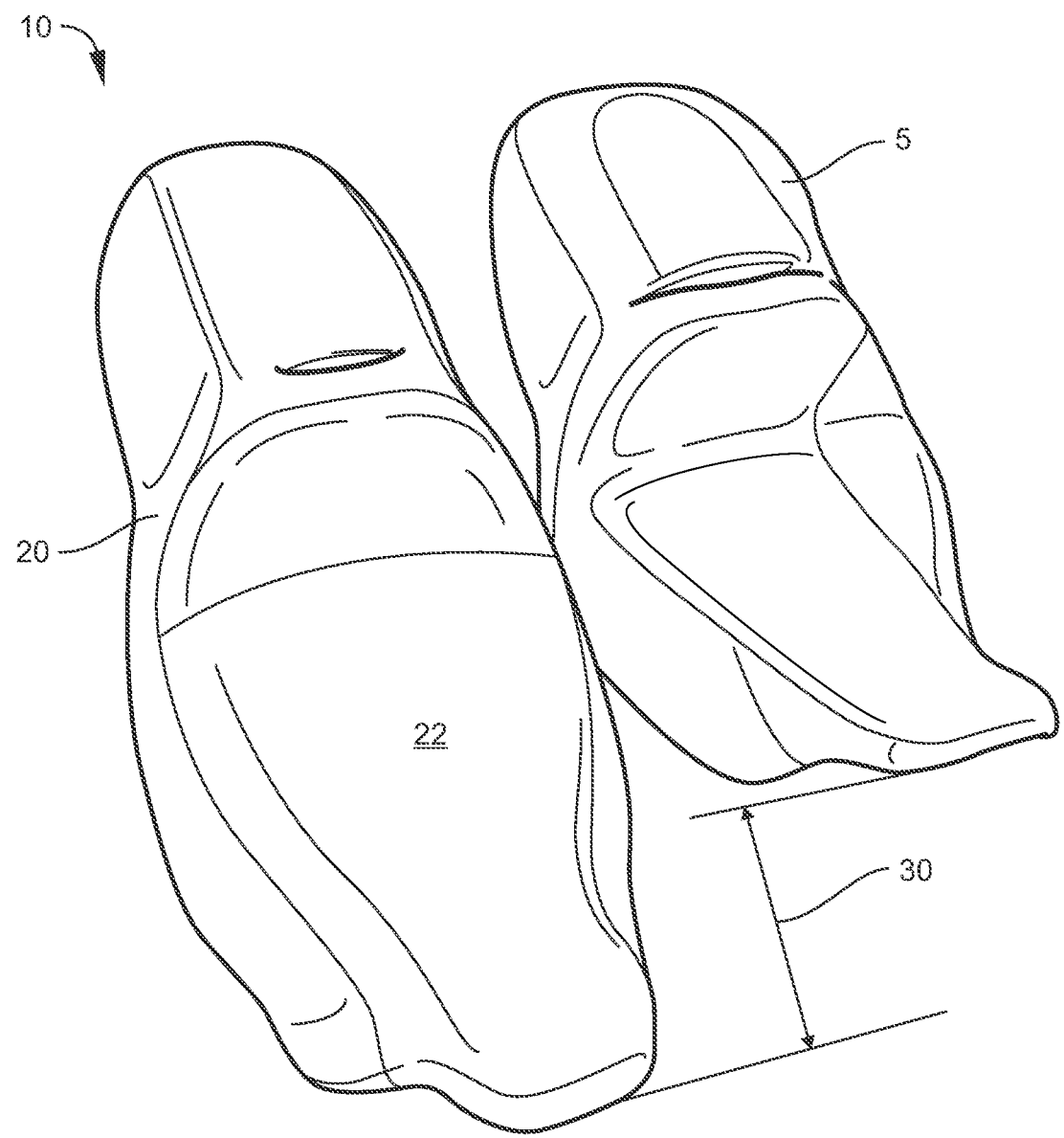
FIG. 10 depicts a top perspective view of a seat with a cover from the rider relocation kit shown in FIG. 1 (left side) shown next to a stock or standard-length seat with a cover (right side)

Referring specifically to FIGS. 3, 9 and 10, the extended seat 20 of kit 10 may be extended from the standard-length seat 5. As shown in the Figures, extended seat 20 may have the same shape and overall design as standard seat 5, but may be extended from its overall length desired distance 30. This desired distance 30 may be varied for extended seat 20 based on the desired relocation of the rider position. As an example, and clearly not limited thereto, extended seat 20 may be extended four inches, or approximately four inches from standard-length seat 5. Extended cover 22 may be provided on extended seat 20. Extended cover 22 may have the same overall shape and design as a standard cover on stock motorcycle 1, but may be extended in overall length to correspond with extended seat 20. As such, if extended seat 20 is extended in overall length four inches, or approximately four inches, extended cover 22 may also be extended in overall length four inches, or approximately four inches.

Figure 11:
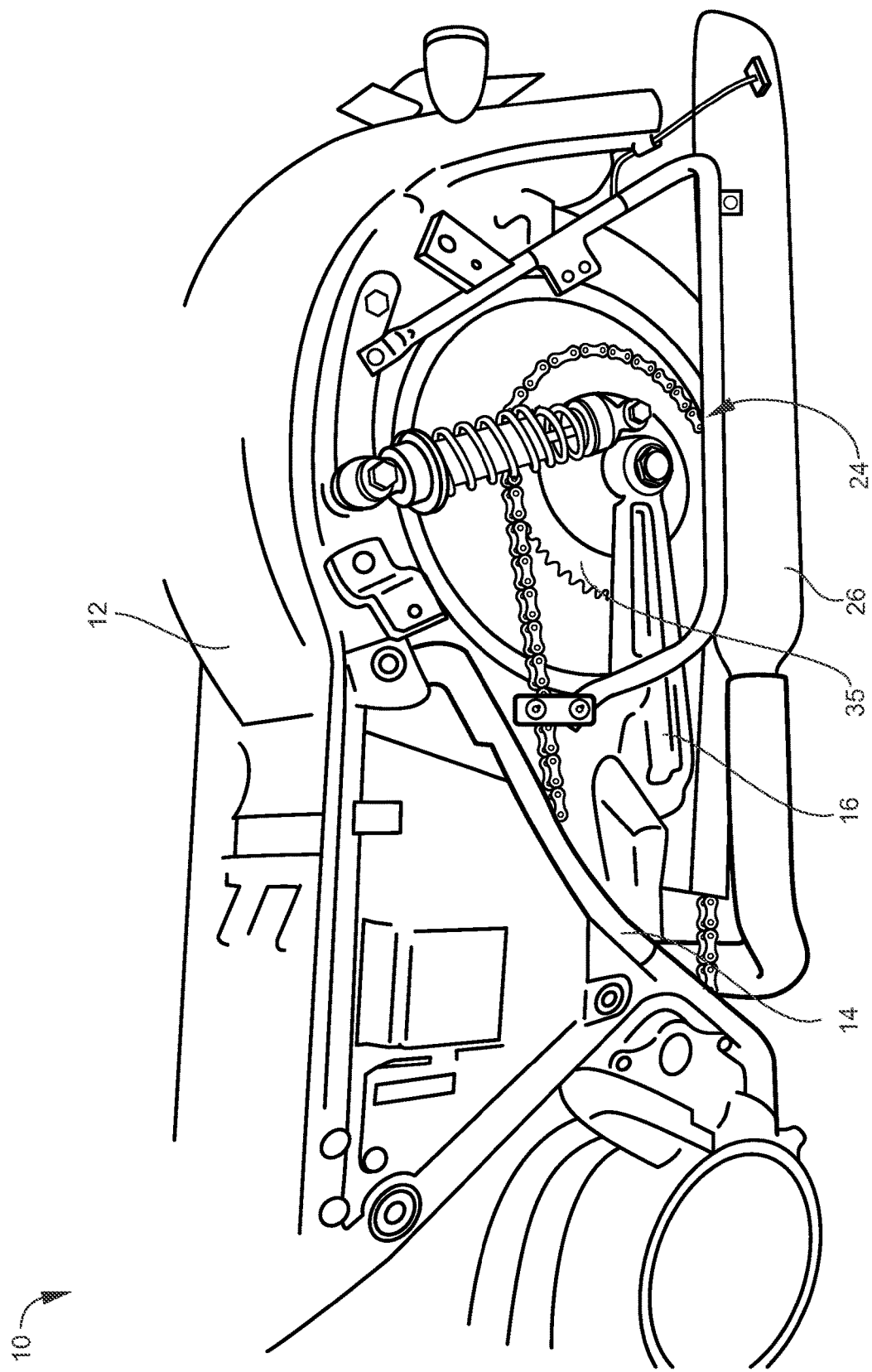
FIG. 11 depicts the rear of a motorcycle with the rider relocation kit shown in FIG. 1 installed, with the final drive conversion with a conversion to an extended chain and extended exhaust.
Figure 13:
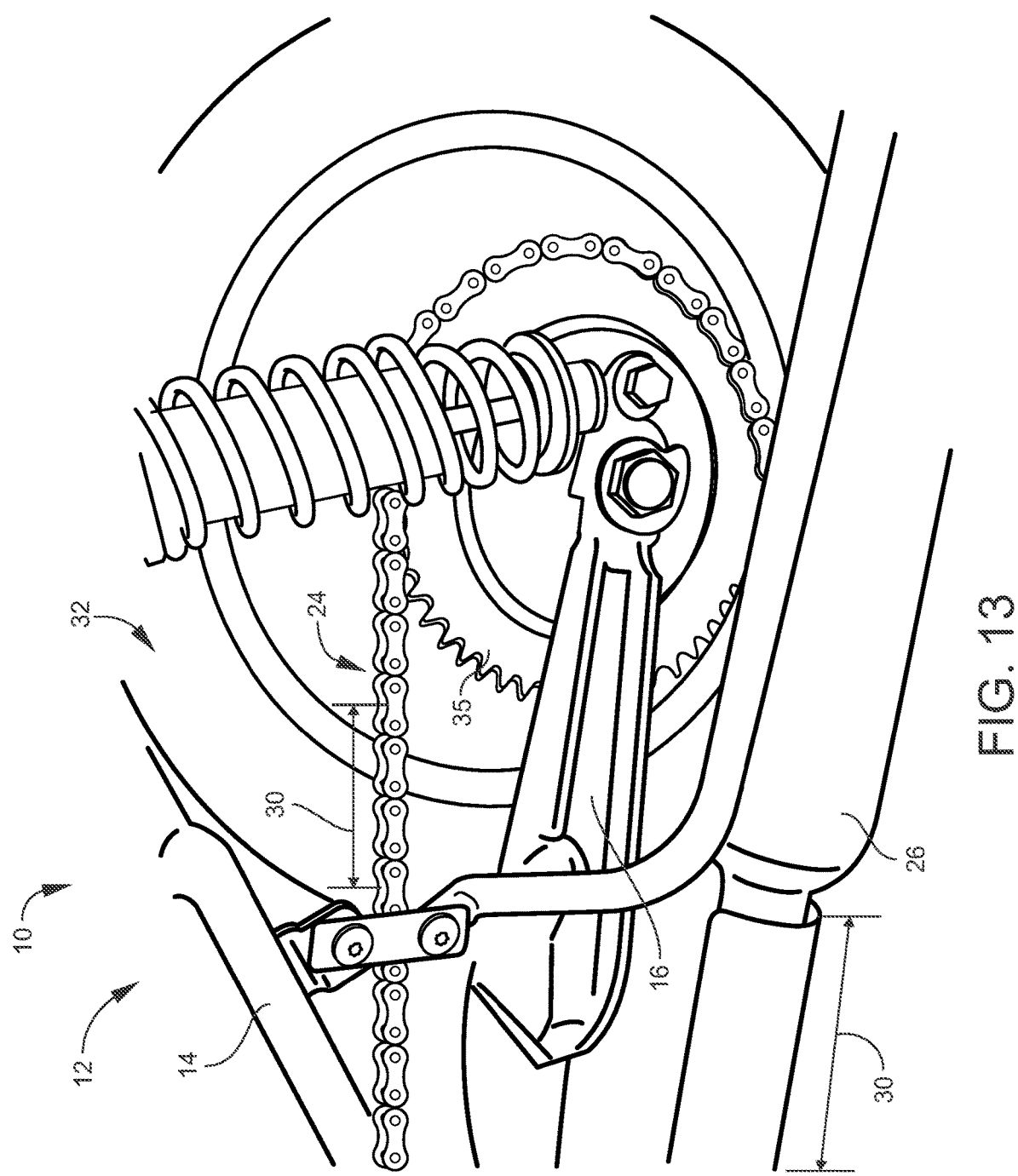
FIG. 13 depicts the final drive conversion of FIG. 11 with a conversion from the standard belt shown in FIG. 12 to an extended chain according to select embodiments of the instant disclosure.

Referring specifically to FIGS. 3, 11 and 13, the extended drive conversion 24 of kit 10 may be for extending the length of the standard drive 6. Extended drive conversion 24 may have the same shape and overall design as standard-length drive 6, but may be extended in overall length desired distance 30. A such extended drive conversion 24 may be an extended belt as shown in FIG. 12. In the alternative, because belts require a mold and may be difficult or expensive to create in extended form, extended drive conversion 24 may be a chain that is extended in length from the standard belt (or vice versa). With this type of extended drive conversion 24, the rear pulley 36 (shown in FIG. 12) for the standard belt drive 6 would need to be changed to rear sprocket 35 (as shown in FIGS. 11 and 13) (or vice versa). This desired distance 30 may be varied for extended drive conversion 24 based on the desired relocation of the rider position. As an example, and clearly not limited thereto, extended drive conversion 24 may be extended four inches, or approximately four inches from standard drive 6.

Figure 14:
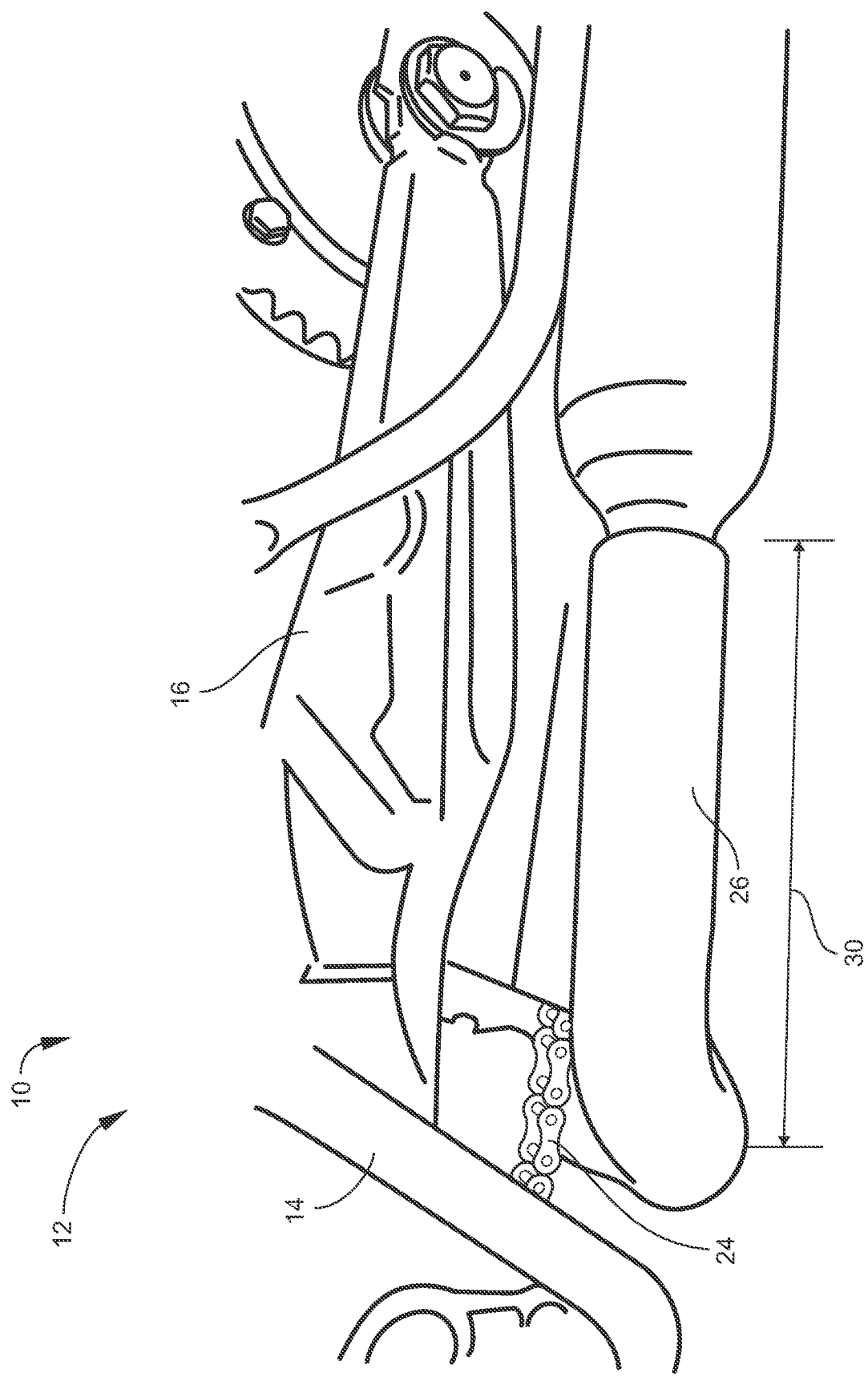
FIG. 14 depicts the extended exhaust shown in FIG. 11 according to select embodiments of the instant disclosure.

Referring specifically to FIGS. 3 and 14, the exhaust extender 26 of kit 10 may be for extending the length of the standard-length exhaust 7. As shown in the Figures, exhaust extender 26 may have the same shape and overall design as standard-length exhaust 7, but may be extended in its overall length desired distance 30. This desired distance 30 may be varied for exhaust extender 26 based on the desired relocation of the rider position. As an example, and clearly not limited thereto, exhaust extender 26 may be extended four inches, or approximately four inches from standard-length exhaust 7. Exhaust extender 26 may be a completely new exhaust that is extended, or exhaust extender 26 may be an add on piece to standard-length exhaust 7.

Figure 2:
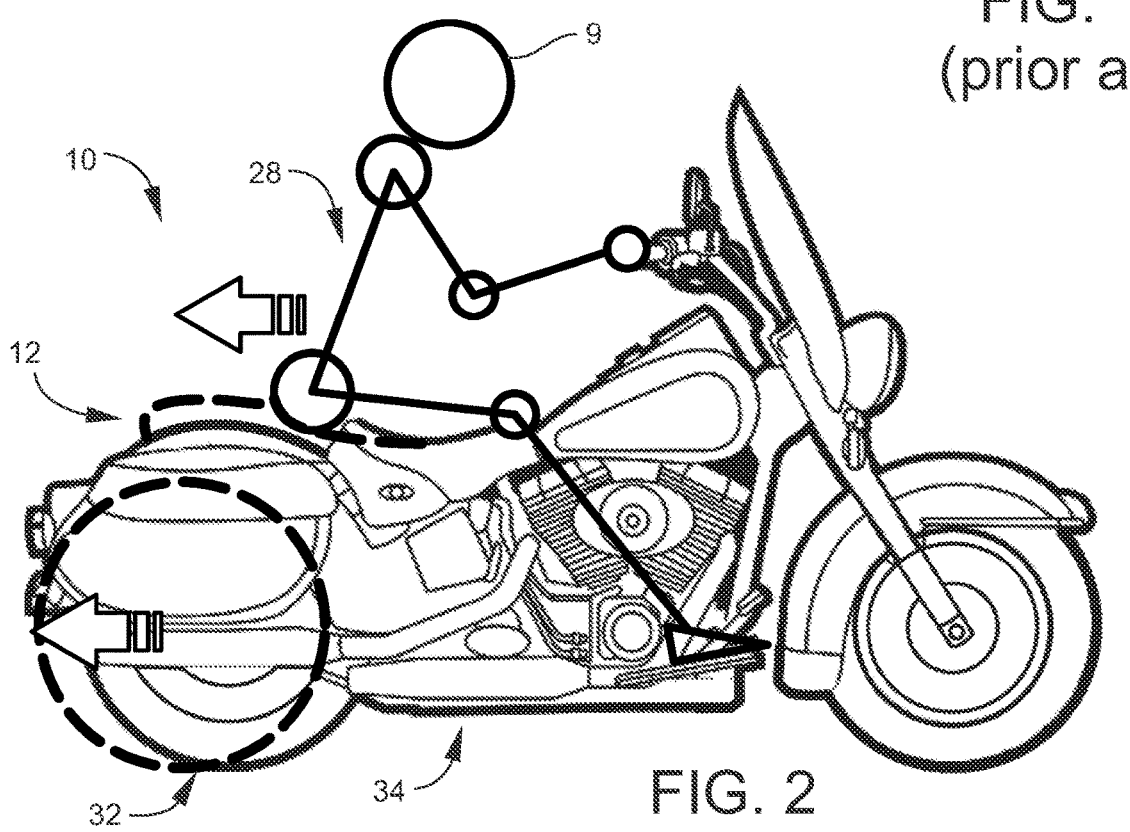
FIG. 2 depicts a side view of a motorcycle with the rider relocation kit installed according to select embodiments of the instant disclosure with the tall rider from FIG. 1 in an extended position.

When the kit 10 is installed on the motorcycle 12 (or trike or other similar vehicle), the rider position on the motorcycle 12 may be relocated backwards (or forward if desired). As shown in FIG. 2, one feature of kit 10 for relocating the rider position may be that when kit 10 is installed on motorcycle 12, the rider position on motorcycle 12 may be relocated so that tall rider 9 may be moved from crouched position 8 (see FIG. 1) to extended position 28. This extended position 28 may provide for more comfort and enjoyment for tall rider 9, especially on long trips or cruising. By relocating the rider position for taller and larger riders allows for adequate room from the handle bars that produces a safer and more comfortable position for the rider. With relocating the rider creates proper clearance for the rider's knees, legs and arms and enough room to properly operate the vehicle in a safe manor.

As shown in the Figures, kit 10 for relocating the rider position may be configured for relocating the rider position desired distance 30. As discussed above, in these embodiments: extended subframe 14 may be extended the desired distance 30 from the standard-length subframe 2; extended swing arm 16 may be extended desired distance 30 from standard-length swing arm 3; extended side panels 18 may be extended desired distance 30 from standard-length side panels 4; extended seat 20 may be extended desired distance 30 from the standard-length seat 5; extended drive conversion 24 may be extended desired distance 30 from standard drive 6; and exhaust extender 26 may extend the standard-length exhaust 7 the desired distance 30. Based on extensive research, the desired distance 30 to relocate the rider position with kit 10 may be four inches, or approximately four inches. This may provide enough room for tall rider 9 without adding too many changes to the ride and feel of the bike. As such, as an example, and clearly not limited thereto, kit 10 may be optimally configured for relocating the rider position the desired distance 30 of four inches or approximately four inches. In this example: extended subframe 14 may be extended four inches or approximately four inches from the standard-length subframe 2; extended swing arm 16 may be extended four inches or approximately four inches from standard-length swing arm 3; extended side panels 18 may be extended four inches or approximately four inches from standard-length side panels 4; extended seat 20 may be extended four inches or approximately four inches from standard-length seat 5; extended drive conversion 24 may be extended four inches or approximately four inches from standard drive 6; and exhaust extender 26 may extend standard-length exhaust 7 four inches or approximately four inches.

If necessary, in select embodiments of kit 10 for relocating the rider position, kit 10 may further include extended brake line 32. See FIGS. 2 and 13. Extended brake line 32 may only be necessary if there was not enough slack built into the standard brake line on the stock motorcycle. However, it has been found that this varies and some stock motorcycles may have lots of slack in the standard brake line, and others may not. As such, extended brake line 32 may be necessary for some kits 10 and not for others. In select embodiments, the extended brake line 32 may be extended desired distance 30 from a standard brake line. As an example, and clearly not limited thereto, the extended brake line 32 may be extended four inches or approximately four inches.

If necessary, in select embodiments of kit 10 for relocating the rider position, kit 10 may further include extended wiring harness 34. Extended wiring harness 34 may only be necessary if there was not enough slack built into the standard wiring harness on the stock motorcycle. However, it has been found that this varies and some stock motorcycles may have lots of slack in the standard wiring harness, and others may not. As such, extended wiring harness 34 may be necessary for some kits 10 and not for others. In select embodiments, the extended wiring harness 34 may be extended desired distance 30 from a standard wiring harness. As an example, and clearly not limited thereto, the extended wiring harness 34 may be extended four inches or approximately four inches.

Figure 15:
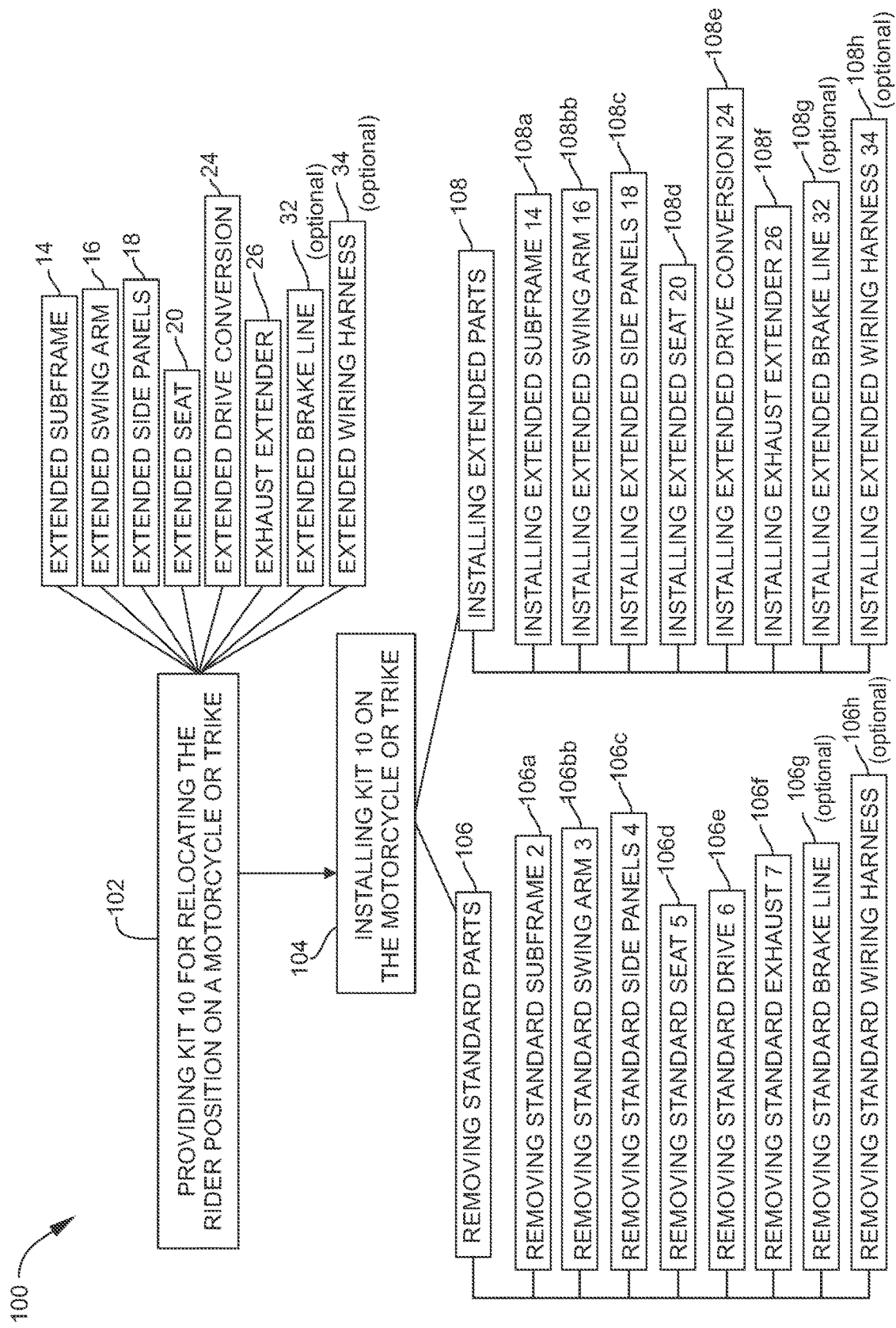
FIG. 15 depicts a flow diagram of select embodiments of the method of relocating the rider position on a motorcycle or a trike.

Referring now to FIG. 15, in another aspect, the instant disclosure embraces method 100 of relocating the rider position on motorcycle 1 (or a trike or other similar vehicle) with standard-length subframe 2, standard-length swing arm 3, standard-length side panels 4, standard-length seat 5, standard drive 6, and standard-length exhaust 7. Method 100 may generally include step 102 of providing kit 10 for relocating the rider position in any of the embodiments shown and/or described herein, and step 104 of installing kit 10 on motorcycle 12 (or trike or other similar vehicle), whereby the rider position on the motorcycle 12 is relocated backwards.

As shown in FIG. 15, in select embodiments of method 100 of relocating the rider position of the instant disclosure, kit 10 for relocating the rider position may include extended subframe 14, extended swing arm 16, extended side panels 18, extended seat 20, extended drive conversion 24, and exhaust extender 26. Extended subframe 14 may be extended from the standard-length subframe 2. Extended swing arm 16 may be extended from standard-length swing arm 3. Extended side panels 18 may be extended from the standard-length side panels 4. Extended seat 20 may be extended from the standard-length seat 5. Extended drive conversion 24 may be for extending the length of the standard drive 6. Exhaust extender 26 may be for extending the length of the standard-length exhaust 7. Whereby, when kit 10 is installed on the motorcycle 12, the rider position on the motorcycle 12 or the trike may be relocated backwards.

One feature of the instant method 100 for relocating the rider position, may be that the step 102 of installing kit 10 on motorcycle 12 may include the rider position on the motorcycle or the trike being relocated so that tall rider 9 is moved from crouched position 8 (see FIG. 1) to extended position 28 (see FIG. 2).

In select embodiments of method 100 for relocating the rider position, kit 10 may be configured for relocating the rider position to desired distance 30. In these embodiments, extended subframe 14 may be extended the desired distance 30 from the standard-length subframe 2; extended swing arm 16 may be extended desired distance 30 from standard-length swing arm 3; extended side panels 18 may be extended desired distance 30 from standard-length side panels 4; extended seat 20 may be extended desired distance 30 from the standard-length seat 5; extended drive conversion 24 may be extended desired distance 30 from standard drive 6; and exhaust extender 26 may extend the standard-length exhaust 7 the desired distance 30. This desired distance may include, but is not limited to, four inches or approximately four inches.

In select embodiments of method 100 or relocating the rider position, if necessary, kit 10 may further include extended brake line 32 and/or extended wiring harness 34. In select embodiments, the extended brake line 32 and/or the extended wiring harness 34 may be extended desired distance 30 from a standard brake line and/or standard wiring harness.

In select embodiments of method 100 of relocating the rider position, step 102 of installing kit 10 on motorcycle 12 or the trike may include the steps of: step 106 of removing standard parts; and step 108 of installing extended parts. In these embodiments, step 106 of removing standard parts may include: step 106a of removing the standard-length subframe 2; step 106b of removing the standard-length swing arm 3; step 106c of removing the standard-length side panels 4; step 106d of removing the standard-length seat 5; step 106e of removing the standard drive 6; and step 106f of removing the standard-length exhaust 7. Likewise, in these embodiments, the step 108 of installing extending parts may include: step 108a of installing the extended subframe 14; step 108b of installing the extended swing arm 16; step 108c of installing the extended side panels 18; step 108*d* of installing the extended seat 20; step 108*e* of installing the extended drive 24; and step 108*f* of installing the extended exhaust 26. If necessary, step 106 of removing standard parts may include: step 106*g* of removing the standard brake line; and step 106*h* of removing the standard wiring harness. Likewise, if necessary, step 108 of installing extended parts may include: step 108*g* of installing extended brake line 32; and step 108*h* of installing extended wiring harness 34.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

The invention claimed is:

1. A method of relocating rider position a desired distance on a motorcycle or a trike with a standard-length subframe, a standard-length swing arm, standard-length side panels, a standard-length seat with an initial seat position a set distance from a rear wheel, a standard drive, and a standard-length exhaust, said method comprising the steps of:
    providing a kit comprising:
        an extended subframe being extended the desired distance from the standard-length subframe;
        an extended swing arm being extended the desired distance from the standard-length swing arm;
        extended side panels being extended the desired distance from the standard-length side panels;
        an extended seat being extended the desired distance from the standard-length seat, the extended seat has an extended seat position the set distance from the rear wheel;
        an extended drive conversion for extending the standard drive the desired distance; and
        an exhaust extender for extending the standard-length exhaust the desired distance;
    installing the kit on the motorcycle or the trike including:
        removing standard parts including:
            removing the standard-length subframe;
            removing the standard-length swing arm;
            removing the standard-length side panels;
            removing the standard-length seat;
            removing the standard drive; and
            removing the standard-length exhaust;
        installing extending parts including:
            installing the extended subframe;
            installing the extended swing arm;
            installing the extended side panels;
            installing the extended seat;
            installing the extended drive; and
            installing the extended exhaust;
    and
    relocating rider position the desired distance on the motorcycle or the trike backwards so that a tall rider is moved from a crouched position to an extended position, where the extended seat position is relocated backwards on the motorcycle or the trike a same distance as the rear wheel is relocated backwards on the motorcycle or the trike, where the set distance of the initial seat position relative to the initial rear wheel position is maintained between the extended seat position and the rear wheel as the rider position is relocated backwards.

2. The method of claim 1, wherein the kit further comprises an extended brake line, an extended wiring harness, or combinations thereof.

3. The method of claim 2, wherein the extended brake line, the extended wiring harness, or the combinations thereof are extended a desired distance from a standard brake line, a standard wiring harness, or combinations thereof.

4. A method of relocating rider position a desired distance on a motorcycle or a trike with a standard-length subframe, a standard-length swing arm, standard-length side panels, a standard-length seat with an initial seat position a set distance from a rear wheel, a standard drive, and a standard-length exhaust, said method comprising the steps of:
    relocating rider position the desired distance on the motorcycle or the trike backwards so that a tall rider is moved from a crouched position to an extended position, where the extended seat position is relocated backwards on the motorcycle or the trike a same distance as the rear wheel is relocated backwards on the motorcycle or the trike, where the set distance of the initial seat position relative to the initial rear wheel position is maintained between the extended seat position and the rear wheel as the rider position is relocated backwards, relocating rider position the desired distance including:
        removing standard parts including:
            removing the standard-length subframe;
            removing the standard-length swing arm;
            removing the standard-length side panels;
            removing the standard-length seat;
            removing the standard drive; and
            removing the standard-length exhaust;
        installing extending parts including:
            installing an extended subframe being extended the desired distance from the standard-length subframe;
            installing an extended swing arm being extended the desired distance from the standard-length swing arm;
            installing an extended side panels being extended the desired distance from the standard-length side panels;
            installing an extended seat being extended the desired distance from the standard-length seat, the extended seat has an extended seat position the set distance from the rear wheel;
            installing an extended drive conversion for extending the standard drive the desired distance; and installing an extended exhaust configured for extending the standard-length exhaust the desired distance.

5. The method of claim 4, wherein:
removing standard parts further including:
  removing a standard length brake line; and
  removing a standard length wiring harness; and
installing extended parts further including:
  installing an extended brake line extended the desired distance from the standard length brake line; and
  installing an extended wiring harness extended the desired distance from the standard length wiring harness.

6. A method of relocating rider position a desired distance of approximately 4 inches on a motorcycle or a trike with a standard-length subframe, a standard-length swing arm, standard-length side panels, a standard-length seat with an initial seat position a set distance from a rear wheel, a standard drive, a standard-length exhaust, a standard length brake line, and a standard length wiring harness, said method comprising the steps of:
providing a kit comprising:
  an extended subframe being extended the desired distance of approximately 4 inches from the standard-length subframe;
  an extended swing arm being extended the desired distance of approximately 4 inches from the standard-length swing arm;
  extended side panels being extended the desired distance of approximately 4 inches from the standard-length side panels;
  an extended seat being extended the desired distance of approximately 4 inches from the standard-length seat, the extended seat has an extended seat position the set distance from the rear wheel;
  an extended drive conversion for extending the standard drive the desired distance of approximately 4 inches;
  an exhaust extender for extending the standard-length exhaust the desired distance of approximately 4 inches;
  an extended brake line extended the desired distance of approximately 4 inches from the standard length brake line; and
  an extended wiring harness extended the desired distance of approximately 4 inches from the standard length wiring harness;
installing the kit on the motorcycle or the trike including:
  removing standard parts including:
    removing the standard-length subframe;
    removing the standard-length swing arm;
    removing the standard-length side panels;
    removing the standard-length seat;
    removing the standard drive;
    removing the standard-length exhaust;
    removing the standard length brake line; and
    removing the standard length wiring harness;
  installing extending parts including:
    installing the extended subframe;
    installing the extended swing arm;
    installing the extended side panels;
    installing the extended seat;
    installing the extended drive;
    installing the extended exhaust;
    installing the extended brake line; and
    installing the extended wiring harness;
and
relocating rider position the desired distance of approximately 4 inches on the motorcycle or the trike backwards so that a tall rider is moved from a crouched position to an extended position, where the extended seat position is relocated backwards on the motorcycle or the trike a same distance of approximately 4 inches as the rear wheel is relocated backwards of approximately 4 inches on the motorcycle or the trike, where the set distance of the initial seat position relative to the initial rear wheel position is maintained between the extended seat position and the rear wheel as the rider position is relocated backwards approximately 4 inches.

* * * * *